(12) United States Patent
Hachisuga

(10) Patent No.: US 12,346,038 B2
(45) Date of Patent: Jul. 1, 2025

(54) READING APPARATUS, IMAGE FORMING APPARATUS, AND READING METHOD

(71) Applicant: FUJIFILM Business Innovation Corp., Tokyo (JP)

(72) Inventor: Masaki Hachisuga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 371 days.

(21) Appl. No.: 17/737,950

(22) Filed: May 5, 2022

(65) Prior Publication Data

US 2023/0133357 A1    May 4, 2023

(30) Foreign Application Priority Data

Oct. 29, 2021 (JP) ................................ 2021-178140

(51) Int. Cl.
G03G 15/04 (2006.01)
F21V 8/00 (2006.01)

(52) U.S. Cl.
CPC ....... *G03G 15/04036* (2013.01); *G02B 6/001* (2013.01)

(58) Field of Classification Search
CPC ............................ G03G 15/04036; G02B 6/001
See application file for complete search history.

(56) References Cited

U.S. PATENT DOCUMENTS

| 5,420,698 A | 5/1995 | Suzuki et al. |
| 11,102,369 B2 | 8/2021 | Matsunaga et al. |
| 2008/0174763 A1* | 7/2008 | Ehbets ............ G01J 3/02 356/369 |
| 2010/0283914 A1 | 11/2010 | Hamada |
| 2014/0036361 A1* | 2/2014 | Woodgate ....... G02B 6/0061 385/9 |
| 2021/0278584 A1* | 9/2021 | Rudy ................ G02B 6/002 |

FOREIGN PATENT DOCUMENTS

| JP | H0623368 | 3/1994 |
| JP | 2008028617 | 2/2008 |
| JP | 2012239031 | 12/2012 |
| JP | 6732154 | 7/2020 |
| WO | 2009107270 | 9/2009 |

OTHER PUBLICATIONS

"Notice of Reasons for Refusal of Japan Counterpart Application", issued on May 13, 2025, with English translation thereof, pp. 1-6.

* cited by examiner

*Primary Examiner* — Joseph S Wong
(74) *Attorney, Agent, or Firm* — JCIPRNET

(57) ABSTRACT

A reading apparatus includes: a light source; a film-shaped optical filter that blocks light having a predetermined wavelength among light from the light source; and a cylindrical light guide body that guides light passing through the optical filter and incident on one end surface to the other end surface, and irradiates an irradiation target body with light emitted from a side surface, in which a diffusion pattern that diffuses the light is disposed on an opposite side not facing the irradiation target body, on the side surface of the light guide body, and the optical filter is disposed at a position facing the end surface of the light guide body to be tilted with respect to the end surface of the light guide body.

20 Claims, 15 Drawing Sheets

READING APPARATUS, IMAGE FORMING APPARATUS, AND READING METHOD

CROSS-REFERENCE TO RELATED APPLICATIONS

This application is based on and claims priority under 35 USC 119 from Japanese Patent Application No. 2021-178140 filed Oct. 29, 2021.

BACKGROUND

(i) Technical Field

The present invention relates to a reading apparatus, an image forming apparatus, and a reading method.

(ii) Related Art

JP2008-028617A discloses an image sensor including a light source, a fluorescent substance that emits white light by light of the light source, an optical filter that blocks light on a longer wavelength side than a wavelength of a predetermined visible light region among the light from the fluorescent substance, a columnar light guide body that propagates the light passing through this optical filter and input to one end side, to the other end side, and emits the light emitted from a side surface to an irradiation target body, and a sensor IC that receives the light reflected from the irradiation target body and converts the light into an electric signal.

JP2012-239031A discloses an image sensor unit including a sensor substrate on which a light source, an image forming element that forms an image of reflected light from an illumination target object, and a photoelectric conversion element that converts the reflected light formed by the image forming element into an electric signal are mounted, in which a resin containing an infrared absorbing dye is provided in a light path between a light emitting surface of the light source and a light receiving portion of the photoelectric conversion element.

JP6732154B discloses an image reading apparatus including a light guide body extending in a main scanning direction in which light from a light source is incident on an end surface in the main scanning direction and the light is emitted to a reading target moving relatively in a sub-scanning direction, an optical filter provided between the end surface of the light guide body in the main scanning direction and the light source to block or attenuate light having a specific wavelength among the light emitted from the light source, a lens body that converges the reflected light reflected by the reading target and forms an image on a light receiving body that converts the reflected light into an electric signal, and a lens holder that holds the light guide body, the optical filter, and the lens body, in which the lens holder has a first positioning portion that determines a position in a height direction orthogonal to the main scanning direction and the sub-scanning direction and a position in the sub-scanning direction of the light guide body, and a second positioning portion that determines a position in the height direction orthogonal to the main scanning direction and the sub-scanning direction and a position in the sub-scanning direction of the optical filter.

SUMMARY

In a case where the optical filter blocks infrared light from the light source, red light in a red light region is also partially blocked depending on an emission angle of the light from the light source to the optical filter due to an angle dependence of the optical filter. For this reason, regarding the optical filter disposed parallel to the end surface of the light guide body, among light emitted from the light source at a high tilt angle, the red light is blocked, as compared with light emitted with a low tilt angle. Therefore, as compared with a center portion of the light guide body in a length direction, the light emitted from the light source with the low tilt angle passes through the optical filter and reaches, at an end portion of the light guide body in the length direction, the light emitted with the high tilt angle passes through the optical filter and reaches, the red light is insufficient and color unevenness occurs in the read image in the main scanning direction.

Aspects of non-limiting embodiments of the present disclosure relate to a reading apparatus, an image forming apparatus, and a reading method that prevents color unevenness from occurring in a read image in a main scanning direction, as compared with a case where an optical filter is disposed parallel to an end surface of a light guide body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading apparatus including: a light source; a film-shaped optical filter that blocks light having a predetermined wavelength among light from the light source; and a cylindrical light guide body that guides light passing through the optical filter and incident on one end surface to the other end surface, irradiates an irradiation target body with light emitted from a side surface, in which a diffusion pattern that diffuses the light is disposed on an opposite side not facing the irradiation target body, on the side surface of the light guide body, and the optical filter is disposed at a position facing the end surface of the light guide body to be tilted with respect to the end surface of the light guide body.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
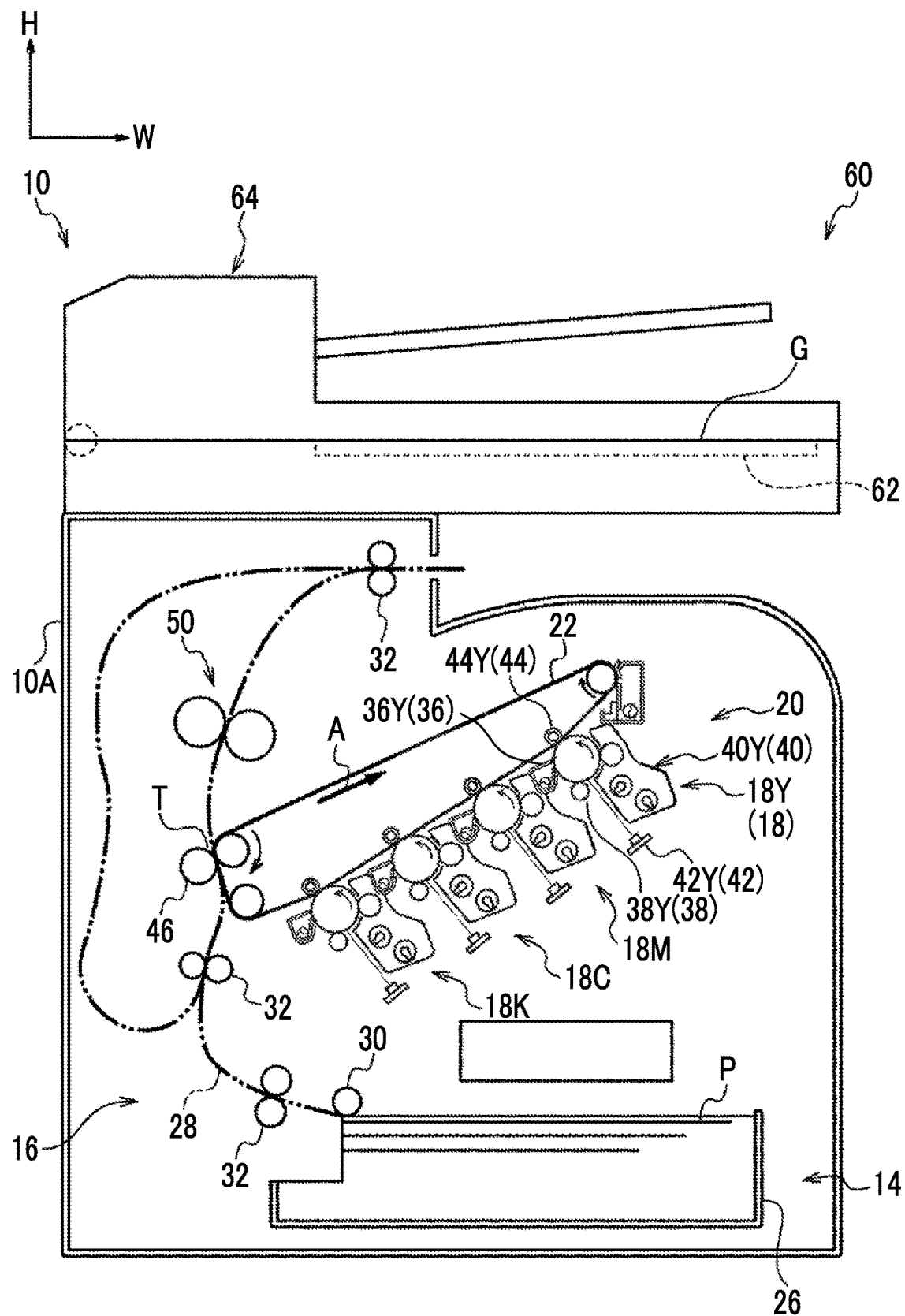
FIG. 1 is a schematic configuration diagram illustrating an image forming apparatus according to a first exemplary embodiment of the invention.

Hereinafter, examples of exemplary embodiments of the present disclosure will be described with reference to the drawings. In each of the drawings, the identical or equivalent components and parts are given the same reference numerals. In addition, a dimensional ratio of the drawing is exaggerated for convenience of description, and is different from an actual ratio, in some cases. An arrow H as illustrated indicates an apparatus upward-downward direction (a vertical direction), an arrow W indicates an apparatus width direction (a horizontal direction), and an arrow D indicates an apparatus depth direction (a horizontal direction).

Overall Configuration

As illustrated in FIG. 1, an image forming apparatus 10 according to a first exemplary embodiment includes an accommodating portion 14 which accommodates a sheet member P as a recording medium from the lower side to the upper side in the apparatus upward-downward direction (the arrow H direction), a transport portion 16 which transports the sheet member P accommodated in the accommodating portion 14, an image forming portion 20 which forms an image on the sheet member P transported from the accommodating portion 14 by the transport portion 16, and an image reading portion 60 which reading the image formed on a document G, in this order.

Accommodating Portion

An accommodating member 26 capable of being pulled out from a housing 10A of the image forming apparatus 10 toward the front side in the apparatus depth direction is provided in the accommodating portion 14, and the sheet member P is loaded on the accommodating member 26. Further, a delivery roll 30 which delivers the sheet member P at a highest level loaded on the accommodating member 26 to a transport path 28 constituting the transport portion 16 is provided in the accommodating portion 14.

Transport Portion

The transport portion 16 is provided with a plurality of transport rolls 32 which transport the sheet member P along the transport path 28.

Image Forming Portion

The image forming portion 20 is provided with four image forming units 18Y, 18M, 18C, and 18K of yellow (Y), magenta (M), cyan (C), and black (K). In the following description, in a case where it is not necessary to distinguish Y, M, C, and K, Y, M, C, and K may be omitted.

The image forming unit 18 of each color is detachable from the housing 10A. The image forming unit 18 of each color includes an image holding body 36, a charging roll 38 which charges a surface of the image holding body 36, and an exposure device 42 which irradiates the charged image holding body 36 with exposure light. Further, the image forming unit 18 of each color includes a developing apparatus 40 which develops an electrostatic latent image formed by exposing the image holding body 36 charged by the exposure device 42 described above and visualizes the electrostatic latent image as a toner image.

In addition, the image forming portion 20 includes an endless transfer belt 22 which circulates in the arrow A direction in FIG. 1, and a primary transfer roll 44 which transfers the toner image formed by the image forming units 18 of each color to the transfer belt 22. Further, the image forming portion 20 includes a secondary transfer roll 46 which transfers the toner image transferred to the transfer belt 22 to the sheet member P, and a fixing device 50 heats and pressurizes the sheet member P onto which the toner image is transferred to fix the toner image to the sheet member P.

Image Reading Portion

Figure 2:
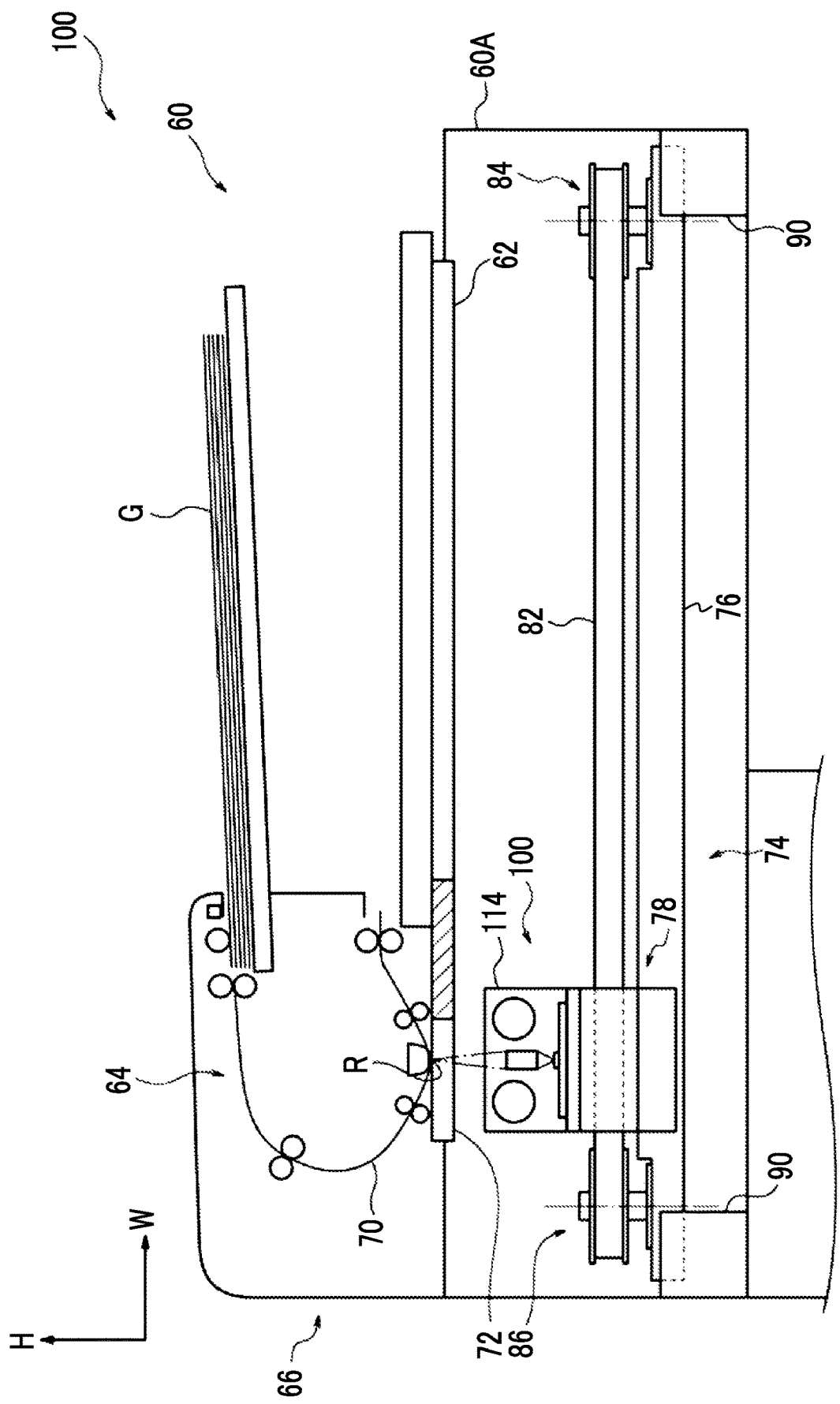
FIG. 2 is a configuration diagram illustrating an image reading portion of the image forming apparatus according to the first exemplary embodiment of the invention.
Figure 3:
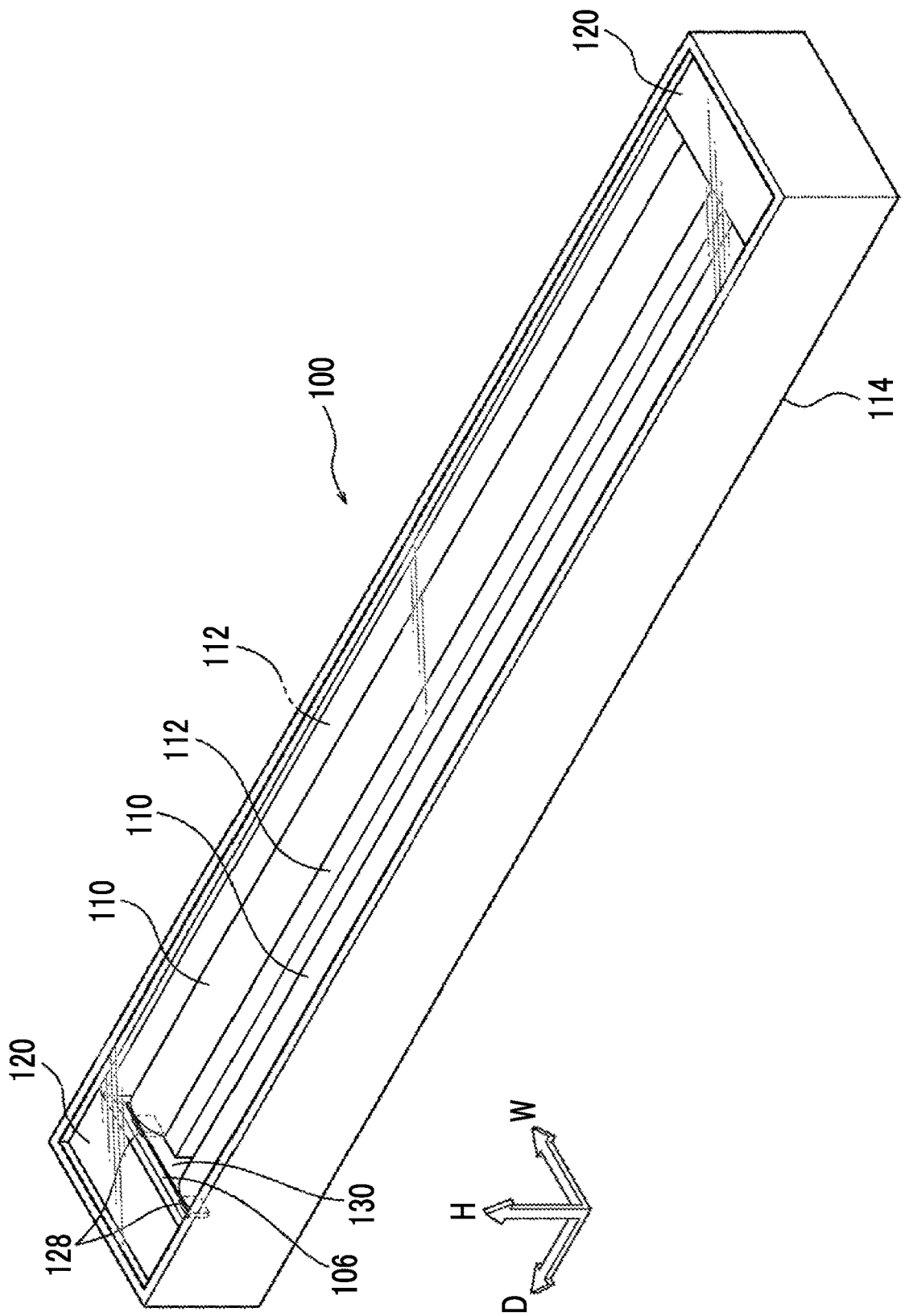
FIG. 3 is a perspective view illustrating an image reading apparatus according to the first exemplary embodiment of the invention.

As illustrated in FIG. 2, the image reading portion 60 includes a first transparent plate 62 (so-called platen glass) on which the document G is placed in a case where an image of one document G is read, and a second transparent plate 72 disposed on one side of the first transparent plate 62 in the apparatus width direction (left side in FIG. 2). The first transparent plate 62 and the second transparent plate 72 are fitted in an upper portion of a housing 60A in the image reading portion 60.

Above the first transparent plate 62 and the second transparent plate 72, an opening and closing cover 66 which opens or closes the first transparent plate 62 and the second transparent plate 72 is disposed. Inside the opening and closing cover 66, a transport device 64 (so-called an ADF apparatus) which transports a plurality of documents G along the transport path 70 in the opening and closing cover 66 and passes the plurality of documents G through a document reading position R above the second transparent plate 72 is provided.

In addition, in a space 88 inside the housing 60A, an image reading apparatus 100 which reads the image of the document G placed on the first transparent plate 62 and the image of the document G transported to the document reading position R by the transport device 64 is provided. Here, the image reading apparatus 100 is an example of a reading apparatus.

Further, the image reading portion 60 includes a drive apparatus 74 which drives the image reading apparatus 100 in the apparatus width direction.

As illustrated in FIG. 2, the drive apparatus 74 includes a shaft 76 extending in the apparatus width direction (a moving direction of the image reading apparatus 100) and a sliding member 78 which is attached to a lower surface of a housing 114 of the image reading apparatus 100 and which is slidably supported to the shaft 76.

Further, the drive apparatus 74 includes a motor 80, a drive pulley 84 which is rotationally driven by transmitting a drive force from the motor 80, a driven pulley 86 which is driven and rotated, and an endless belt 82 winding around the drive pulley 84 and the driven pulley 86. The drive pulley 84 is attached to one end of the shaft 76, and the driven pulley 86 is attached to the other end of the shaft 76.

Details of the image reading apparatus 100 will be described below.

Action of Image Forming Apparatus

In the image forming apparatus 10, an image is formed as follows.

First, the image reading portion 60 reads an image of the document G. Specifically, in a case of reading the image of the document G transported by the transport device 64, a drive force of the motor 80 (not illustrated) is transmitted via the endless belt 82, and the image reading apparatus 100 moves to a transport reading position on the other side in the apparatus width direction and stops, as illustrated in FIG. 2. The image reading apparatus 100 disposed at the transport reading position reads the image of the document G transported by the transport device 64.

Further, in a case of reading the image of the document G placed on the first transparent plate 62, although not illustrated, the image reading apparatus 100 moves from a reading start position toward a reading end position in the apparatus width direction along the first transparent plate 62 by the drive apparatus 74, while reading the image of the document G.

Subsequently, based on image information read by the image reading portion 60, the exposure device 42 emits the exposure light on a surface of the image holding body 36 of each color charged by the charging roll 38 to form an electrostatic latent image (see FIG. 1).

Therefore, the electrostatic latent image corresponding to the data is formed on the surface of the image holding 36 of each color. Further, the developing apparatus 40 for each color develops this electrostatic latent image, and visualizes the electrostatic latent image as a toner image. Further, the toner image formed on the surface of the image holding body 36 of each color is transferred to the transfer belt 22 by the primary transfer roll 44.

Therefore, the sheet member P delivered from the accommodating member 26 to the transport path 28 by the delivery roll 30 is delivered to a transfer position T at which the transfer belt 22 and the secondary transfer roll 46 come into contact with each other. At the transfer position T, the sheet member P is transported between the transfer belt 22 and the secondary transfer roll 46, so that the toner image on the surface of the transfer belt 22 is transferred to the sheet member P.

The toner image transferred to the sheet member P is fixed to the sheet member P by the fixing device 50. The sheet member P on which the toner image is fixed is output to an outside of the housing 10A by the transport roll 32.

Central Portion Configuration

Next, details of the image reading apparatus 100 will be described.

As illustrated in FIGS. 3 to 7, the image reading apparatus 100 includes a light emitting device 124 that irradiates the document G with light, a light receiving portion 117 that receives light, and a rod lens array 112 that guides light to the light receiving portion 117, and a glass plate 122. The document G is an example of an irradiation target body. The image reading apparatus 100 reads an image formed on the document G by using a known contact image sensor (CIS) method.

Light Receiving Portion

Figure 4:
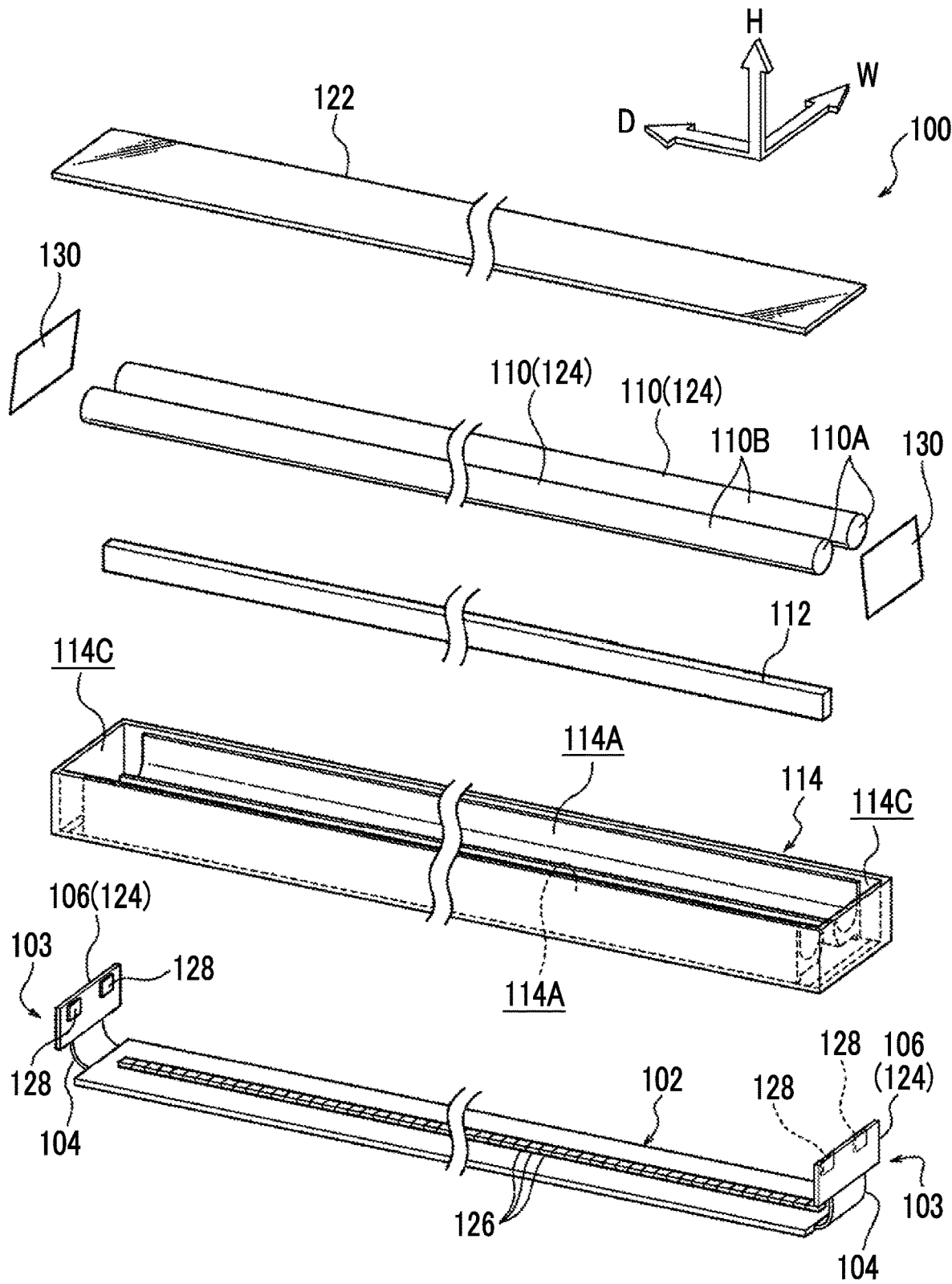
FIG. 4 is an exploded perspective view illustrating the image reading apparatus according to the first exemplary embodiment of the invention.

The light receiving portion 117 has a light receiving substrate 102 and a plurality of light receiving elements 126 arranged in the apparatus depth direction. As illustrated in FIG. 4, a plate thickness direction of the light receiving substrate 102 has an upward-downward direction. The light receiving substrate 102 has a rectangular shape extending in the apparatus depth direction, as viewed from above, and is disposed below the housing 114. Further, the plurality of light receiving elements 126 are mounted on an upper surface of the light receiving substrate 102.

Rod Lens Array

Figure 5:
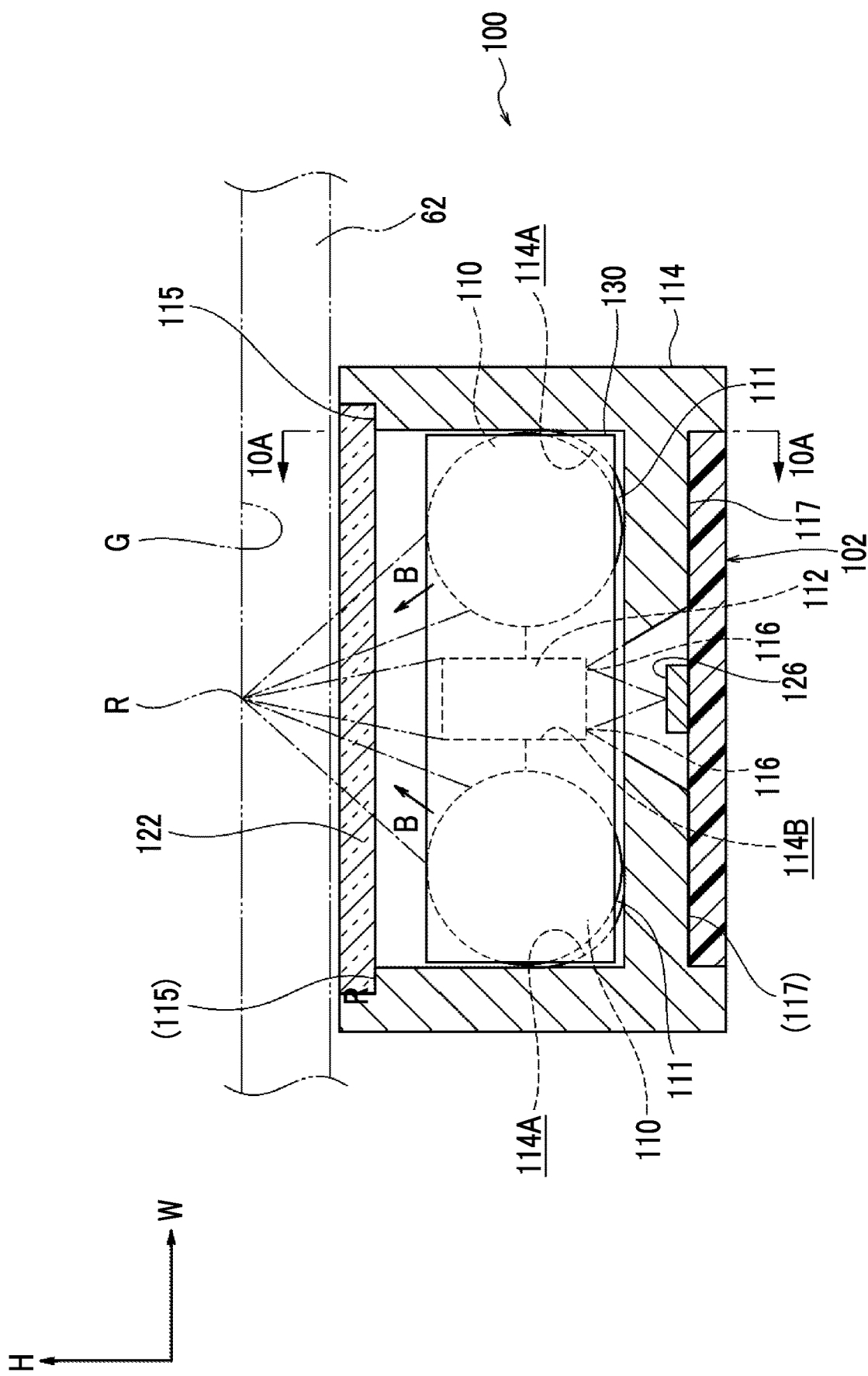
FIG. 5 is a cross-sectional view (cross-section of 10B-10B line in FIG. 6) illustrating the image reading apparatus according to the first exemplary embodiment of the present invention.

The rod lens array 112 consisting of a transparent material (for example, glass) is formed in a rectangular parallelepiped shape extending in the apparatus depth direction, and is accommodated in a lens accommodating portion 114B, which will be described below, in the housing, as illustrated in FIG. 5. The rod lens array 112 is configured to collect light emitted from a side surface 110B of a light guide body 110, which will be described below, and reflected from the document G on which the image is formed, in the light receiving element 126.

Glass Plate

A plate thickness direction of the glass plate 122 has an upward-downward direction, and the glass plate 122 has a rectangular shape extending in the apparatus depth direction, as viewed from above. As illustrated in FIG. 5, the glass plate 122 is fixed to the housing 114 by a fixing section (not illustrated) in a state in which an edge portion of the glass plate 122 is in contact with a step portion 115 of the housing 114, and is disposed to cover an upper surface of the housing 114.

Light Emitting Device

Next, details of the light emitting device 124 will be described.

As illustrated in FIGS. 4 and 5, the light emitting device 124 includes the light guide body 110, an irradiation portion 103, and the housing 114 constituting the device main body. The light emitting device 124 has two light guide bodies 110, and the respective light guide bodies 110 are arranged in parallel to be symmetrical with respect to a center of the housing 114 in the apparatus width direction.

Light Guide Body

As illustrated in FIG. 4, the light guide body 110 is formed in a cylindrical shape using a transparent material (for example, acrylic resin), and extends in the apparatus depth direction as a longitudinal direction. The light guide body 110 is accommodated in a light guide body accommodating portion 114A (see FIG. 5) which will be described below in the housing 114 (see FIG. 4). Further, the light guide body 110 travels light incident on one end surface 110A through an optical filter 130, which will be described below, in the longitudinal direction, and irradiates the document G with the light emitted from the side surface 110B.

Figure 6:
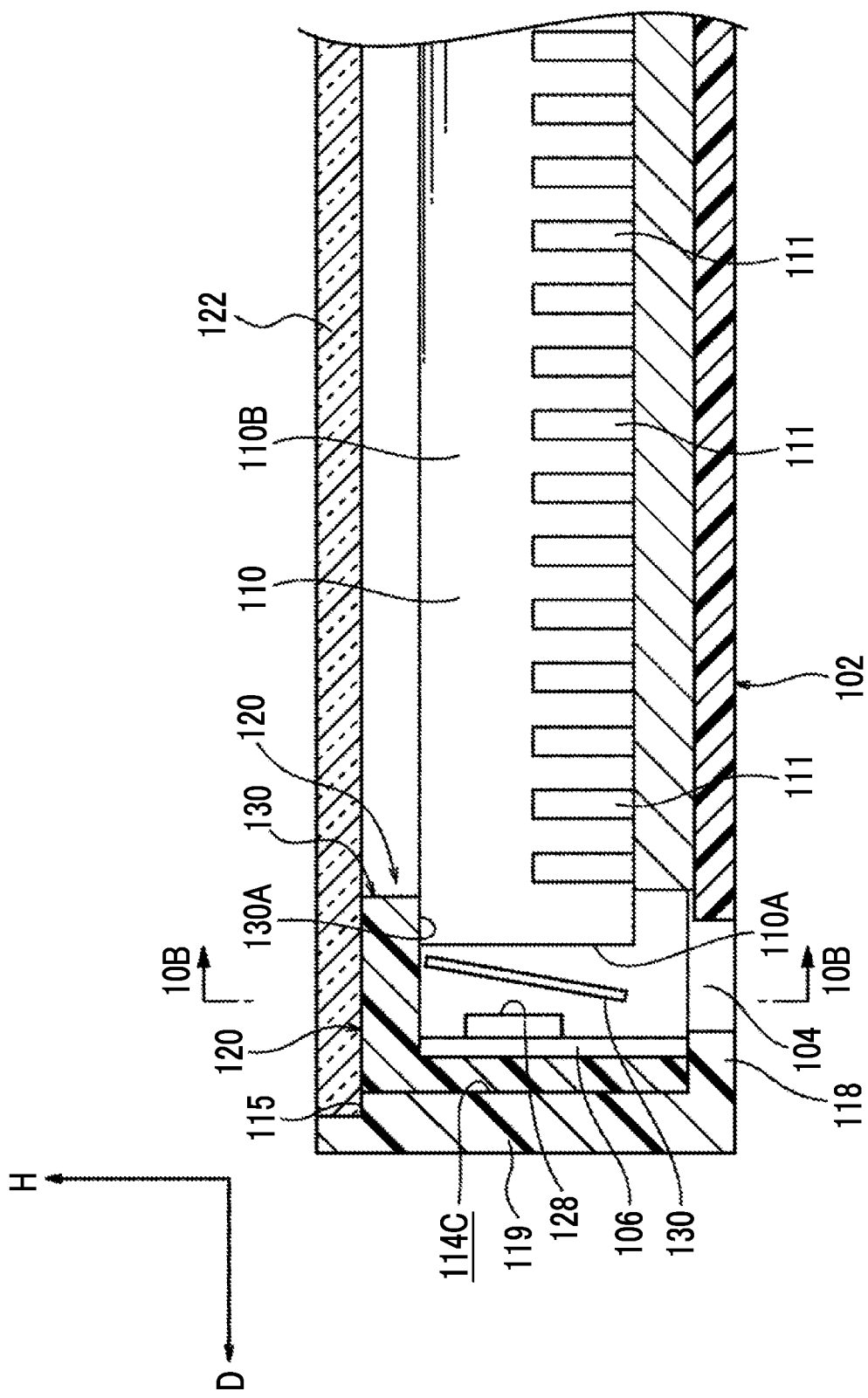
FIG. 6 is a cross-sectional view (cross-section of 10A-10A line in FIG. 5) illustrating the image reading apparatus according to the first exemplary embodiment of the present invention.
Figure 7:
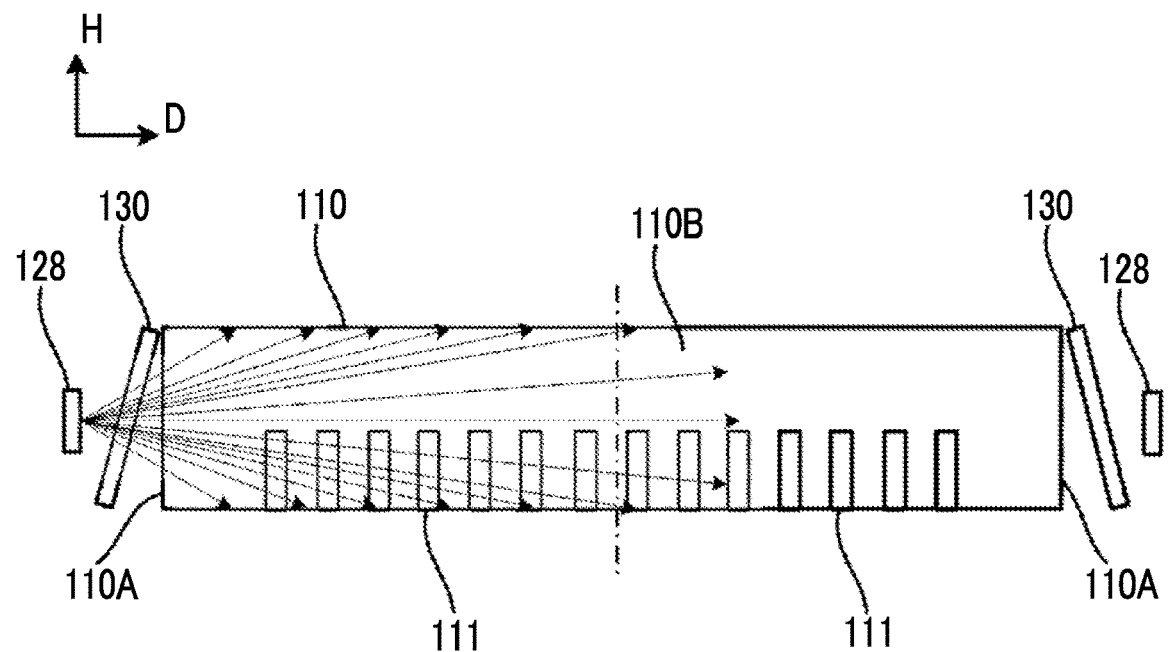
FIG. 7 is an explanatory diagram describing a diffusion pattern and light emitted from a light emitting element according to the first exemplary embodiment of the present invention.

Further, as illustrated in FIGS. 5 to 7, the light guide body 110 is provided with a diffusion pattern 111 that diffuses light incident from the end surface 110A of the light guide body 110 and advances the light in the longitudinal direction, and emits the light toward the upper side of the rod lens array 112 (in an arrow B direction in FIG. 5). Further, as illustrated in FIG. 5, the diffusion pattern 111 is disposed on an opposite side not facing the document G, on the side surface 110B of the light guide body 110. More specifically, on the side surfaces 110B of the two light guide bodies 110, the diffusion pattern 111 is disposed on the opposite side not facing the document G and on the side away from the other light guide body 110. That is, the diffusion pattern 111 is displaced at a position at which a center of the fan-shaped diffusion pattern 111 illustrated in FIG. 5 in the apparatus width direction passes through a center of the light guide body 110 and faces a document reading position R, not directly below the light guide body 110 in an apparatus downward direction. Further, as illustrated in FIG. 7, the diffusion pattern 111 is provided over the light guide body 110 in the longitudinal direction at predetermined intervals. Here, as an example, the diffusion pattern 111 is composed of solidified white paint, and diffuses light traveling inside the light guide body 110 toward the upper surface side (document G side) of the light guide body 110.

Irradiation Portion

As illustrated in FIG. 4, the irradiation portion 103 includes wiring substrates 104, an element substrate 106, LED light emitting elements 128 (hereinafter, referred to as "light emitting elements 128"), and the optical filter 130.

The wiring substrate 104 is a so-called flexible flat cable, and is provided in pairs, as illustrated in FIG. 4. A base end of one wiring substrate 104 is connected to an end portion of the light receiving substrate 102 on the back side (left side in FIG. 4) in the apparatus depth direction, and a base end of the other wiring substrate 104 is connected to an end portion of the light receiving substrate 102 on the front side (right side in FIG. 4) in the apparatus depth direction.

The element substrate 106 is a so-called flexible printed circuit substrate, and a plate thickness direction of the element substrate 106 is the apparatus depth direction. As viewed from above, the element substrate 106 is a substrate having a rectangular shape as viewed from the apparatus depth direction, and is provided in pairs as illustrated in FIG. 4. One element substrate 106 is connected to a tip of one wiring substrate 104, and the other element substrate 106 is connected to a tip of the other wiring substrate 104. Further, the light emitting elements 128 arranged in the apparatus width direction are mounted on one surface of each element substrate 106. The light emitting element 128 is an example of a light source. Here, the element substrate 106 may have flexibility. The flexibility means, for example, that a substrate having a width of 10 mm is supported in a cantilevered state, and a portion of 10 mm from a support end is pushed from above with a force of 9.8 N so that the amount of deflection becomes 1 mm or more.

As illustrated in FIG. 6, the light emitting element 128 is disposed on a surface of the element substrate 106 on the light guide body 110 side for each of the two light guide bodies 110 to face the end surface 110A of the light guide body 110. Each of the light emitting elements 128 emits light to irradiate the end surface 110A with the light.

The optical filter 130 is disposed between the light emitting element 128 and the end surface 110A of the light guide body 110, and blocks light having a predetermined wavelength among the light from the light emitting element 128, and is formed in a flat-plate film shape. Here, in the present exemplary embodiment, the optical filter 130 is a filter (IR Cut Filter) that blocks light having a predetermined wavelength, for example, light having a wavelength larger than approximately 670 nm such as infrared light. Further, as illustrated in FIG. 5, one optical filter 130 is disposed for the two light guide bodies.

Figure 8:
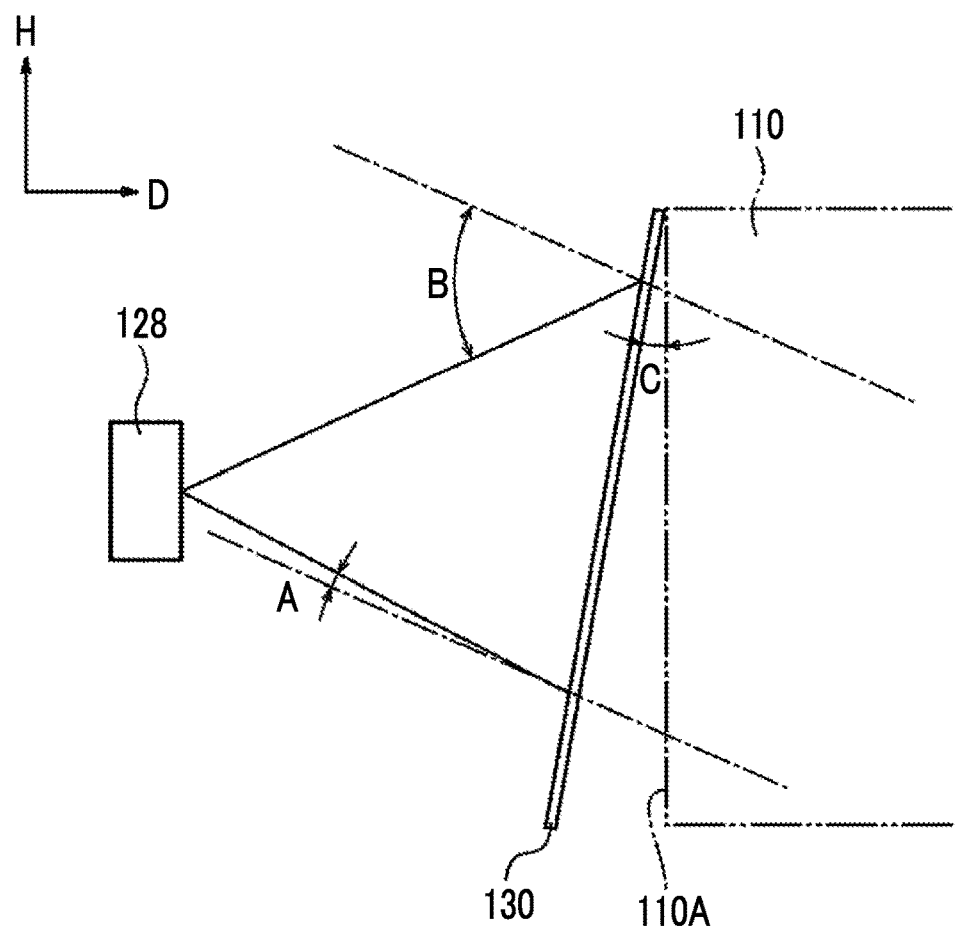
FIG. 8 is an explanatory diagram describing a state in which an optical filter according to the first exemplary embodiment of the present invention is disposed to be tilted with respect to an end surface of a light guide body.

In addition, as illustrated in FIGS. 5 to 8, the optical filter 130 is disposed at a position facing the end surface 110A of the light guide body 110, and is disposed to be tilted with respect to the end surface 110A of the light guide body 110. That is, the optical filter 130 is disposed to be tilted with respect to the end surface 110A of the light guide body 110 such that a position of the optical filter 130 facing the diffusion pattern 111 side (apparatus downward direction) is farther from the light guide body 110 than a position of the optical filter 130 facing the document G side (apparatus upward direction). More specifically, as illustrated in FIG. 8, the optical filter 130 is disposed such that among angles formed by light from the light source and a normal line with respect to a plane of the optical filter 130, an angle A on a side facing the diffusion pattern 111 side is smaller than an angle B on a side facing the document G side of the end surface 110A of the light guide body 110.

The point that the optical filter 130 is disposed to be tilted will be described in detail with reference to FIGS. 9 to 13.

Figure 9:
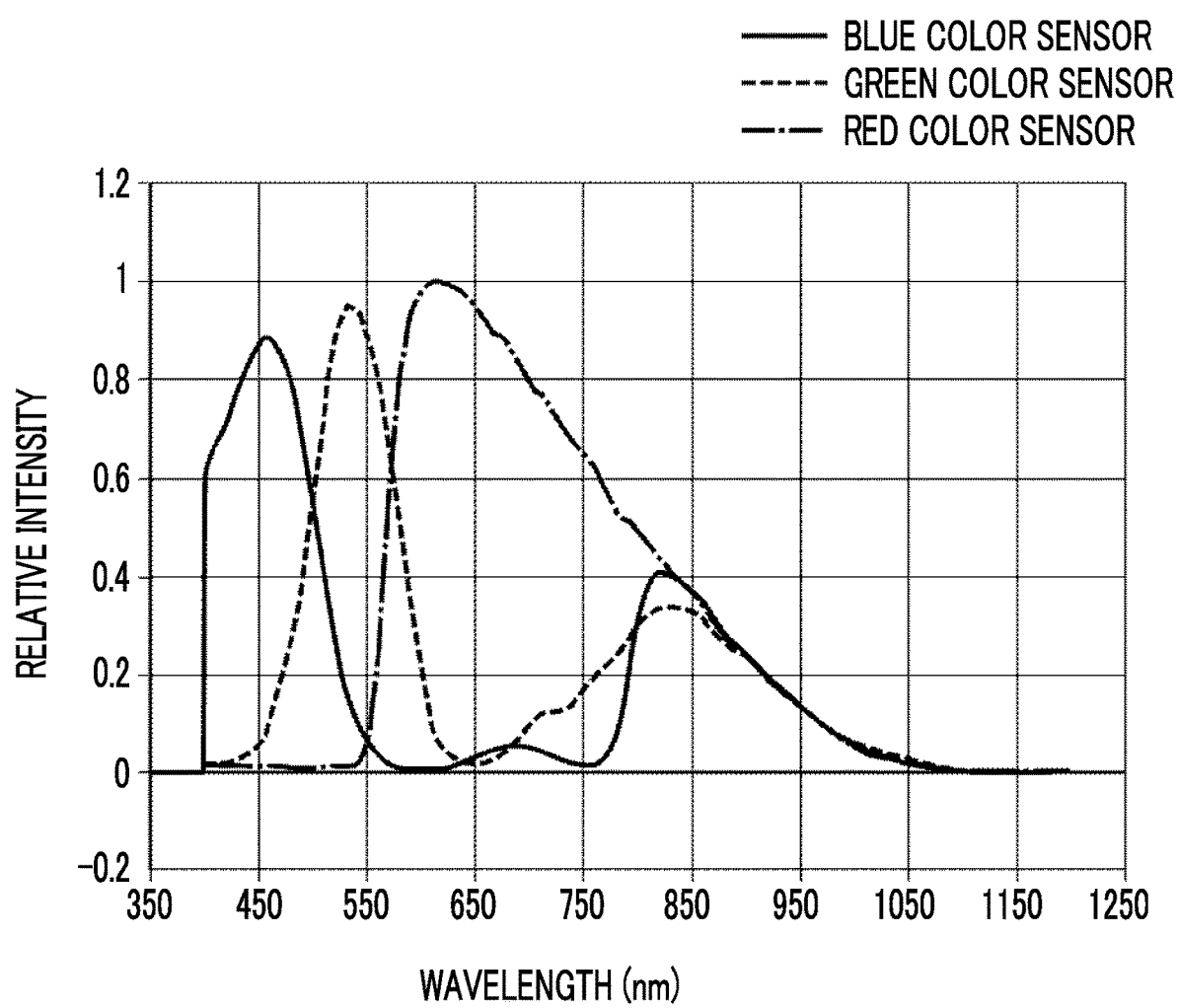
FIG. 9 is a diagram illustrating a spectral characteristic of a light receiving element according to the first exemplary embodiment of the present invention.

FIG. 9 is a diagram illustrating an example of each spectral characteristic of a Blue sensor, a Green sensor, and a Red sensor provided in each light receiving element. The Blue sensor uses blue color (475 nm), green color (525 nm), and red color (640 nm) as predetermined reading colors. Although each sensor selectively receives light for each color, infrared light in the vicinity of reading of red color causes noise. Further, as illustrated in FIG. 9, a spectral sensitivity of the light receiving portion of a sensor chip 6 having a C-MOS configuration using a silicon semiconductor also receives light on the long wavelength side such as infrared rays.

Figure 10:
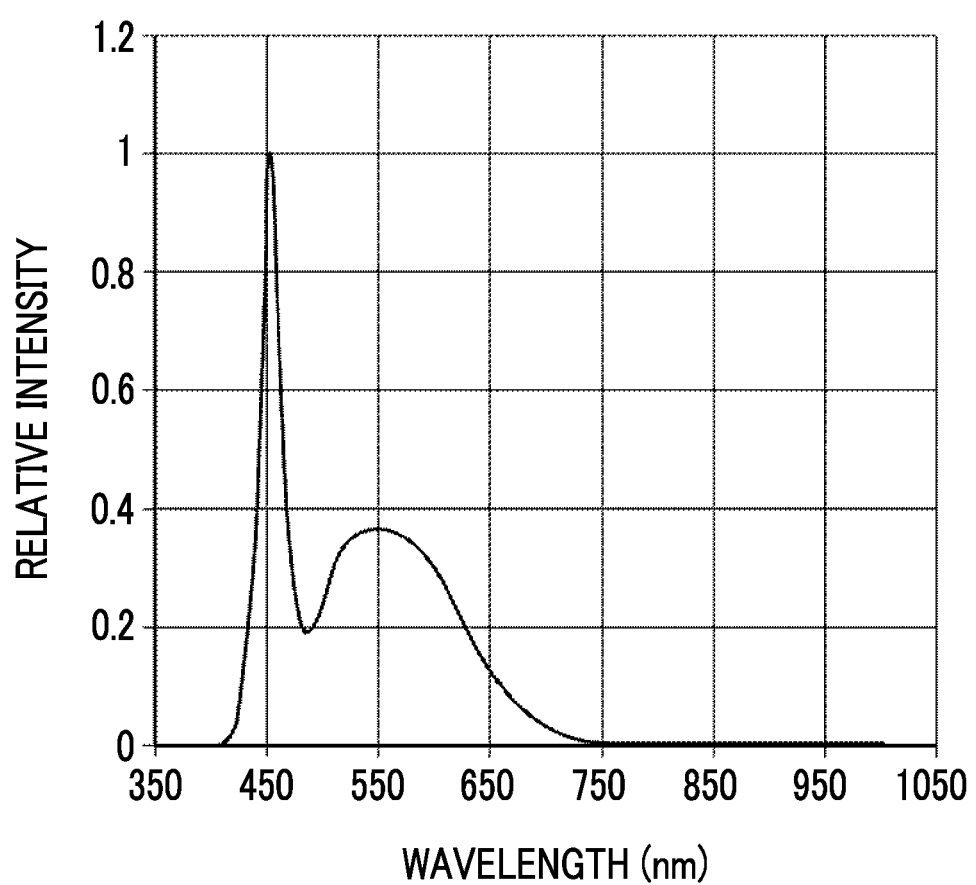
FIG. 10 is a diagram illustrating a spectral characteristic of the light emitting element according to the first exemplary embodiment of the present invention.

FIG. 10 is a diagram illustrating a spectral characteristic of the light emitting element 128. As illustrated in FIG. 10, the light source which consists of an LED also outputs infrared light on a longer wavelength side than red, and each sensor also receives the infrared light on the longer wavelength side than red, which affects an image quality.

Figure 11:
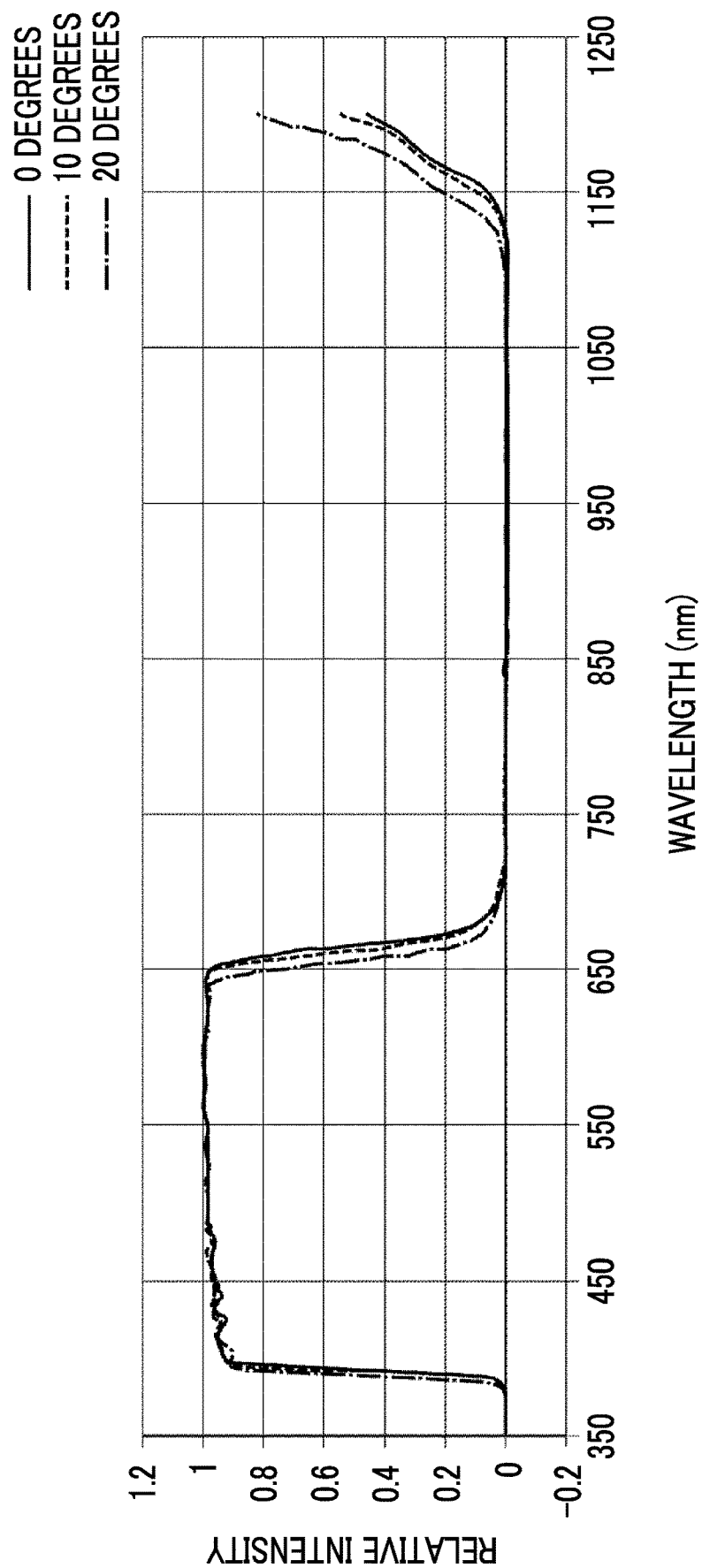
FIG. 11 is a diagram illustrating a spectral characteristic of the optical filter according to the first exemplary embodiment of the present invention.
Figure 12:
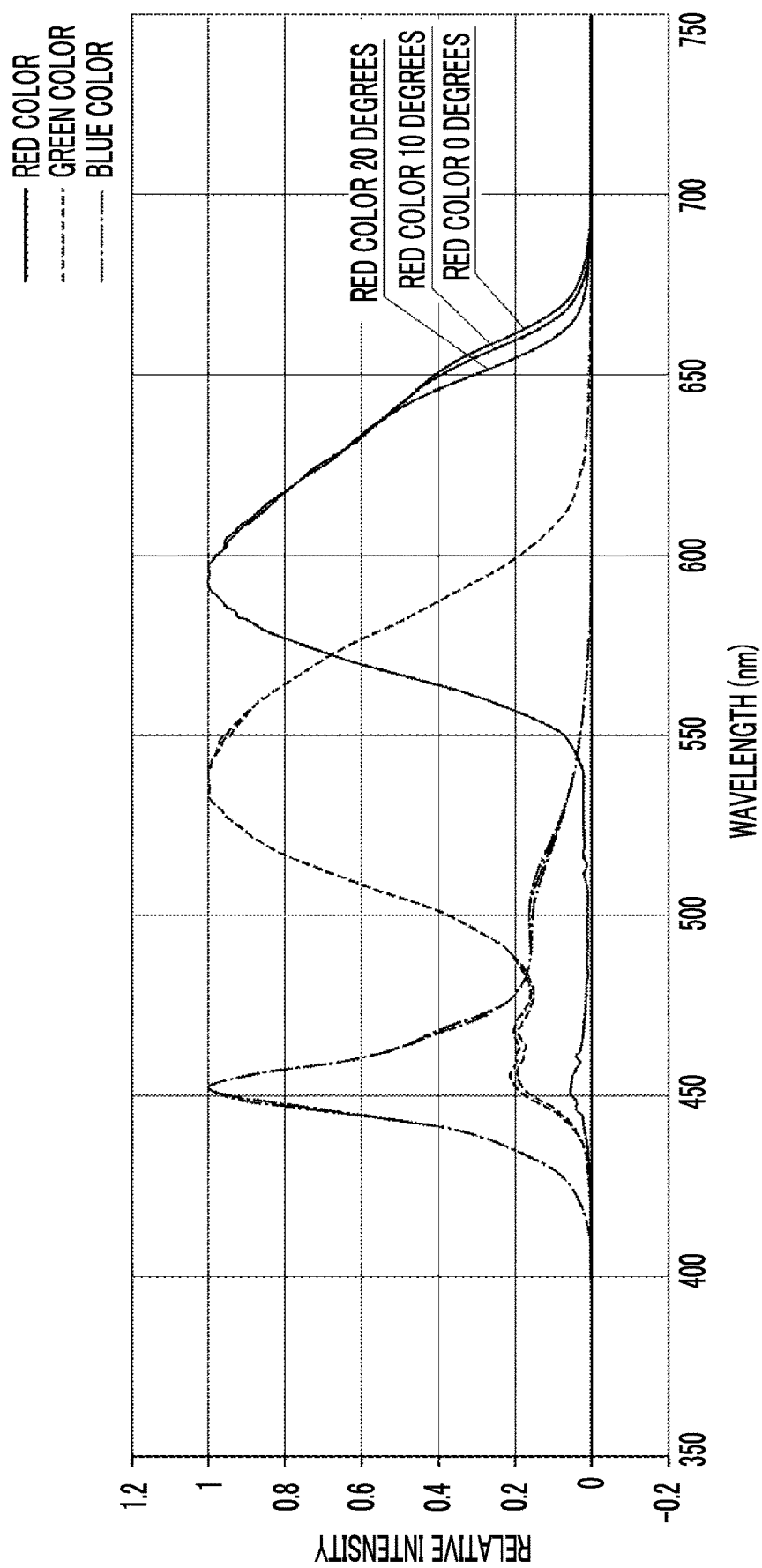
FIG. 12 is a diagram illustrating the spectral characteristics of the image reading apparatus according to the first exemplary embodiment of the present invention.

The optical filter 130 is provided to remove such infrared light. As illustrated in FIG. 11, it can be seen that the optical filter 130 has a property of cutting red color (so-called blue shift) in a case where the optical filter 130 has 20 degrees with respect to the end surface 110A of the light guide body 110 (angle C in FIG. 8), as compared with a case where the optical filter 130 has 0 degrees parallel to the end surface 110A of the light guide body 110 (angle C in FIG. 8). Therefore, as illustrated in FIG. 12, regarding blue color or green color, even in a case where the degree of the optical filter 130 is changed from 0 degrees to 20 degrees with respect to the end surface 110A of the light guide body 110, the spectral characteristic is not changed or very slightly changed. Regarding red color, in a case where the degree is changed from 0 degrees to 20 degrees, the spectral characteristic is changed and the red color is cut.

Figure 13:
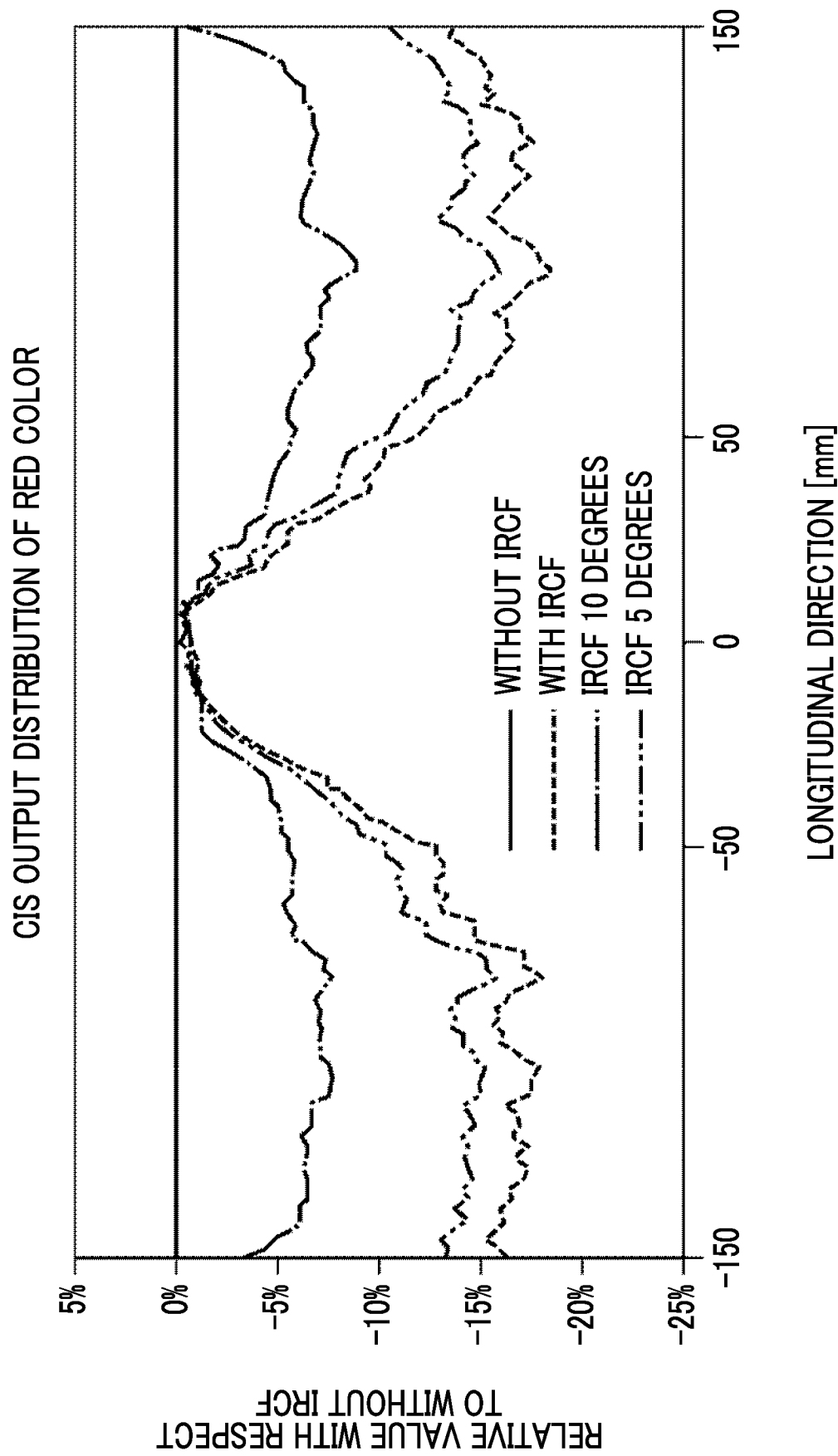
FIG. 13 is a diagram illustrating relative values of an output distribution of red color in a case where an incident angle is changed with respect to a case where the optical filter according to the first exemplary embodiment of the present invention is not provided.

FIG. 13 is a diagram illustrating relative values of an output distribution of red color from a center (0 mm) to an end portion (+150 mm, −150 mm) of the light guide body 110 in the longitudinal direction, in a case where the optical filter 130 is provided parallel to the end surface 110A of the light guide body 110 (with IRCF), in a case where the optical filter 130 is tilted by 5 degrees with respect to the end surface 110A of the light guide body 110 (IRCF 5 degrees), and in a case where the optical filter 130 is tilted by 10 degrees with respect to the end surface 110A of the light guide body 110 (IRCF 10 degrees), based on a case where the optical filter 130 is not provided (without IRCF). Here, since the light guide body 110 has a length corresponding to an A3 paper size (297 mm×420 mm), the length is approximately 300 mm. Further, in a case where the optical filter 130 is tilted by 5 degrees with respect to the end surface 110A of the light guide body 110, the optical filter 130 facing the lower surface side of the light guide body 110 is tilted by 5 degrees to be separated from the end surface 110A of the light guide body 110 (angle C in FIG. 8), based on a case where the optical filter 130 is provided parallel to the end surface 110A of the light guide body 110.

As illustrated in FIG. 13, in a case where the optical filter 130 is provided parallel to the end surface 110A of the light guide body 110 (with IRCF), the output of the reddest color is the smallest. Specifically, at the center (0 mm) of the light guide body 110 in the longitudinal direction, the output distribution of red color is not changed or is very slightly changed even in a case where the optical filter 130 is not provided (without IRCF). Meanwhile, the output distribution of red color becomes smaller as a distance from the center (0 mm) is increased, and the output distribution becomes approximately −18% from the vicinity of approximately 70 mm (+70 mm, −70 mm) to the end portion (+150 mm, −150 mm). Specifically, even in a case where the optical filter 130 is tilted by 5 degrees with respect to the end surface 110A of the light guide body 110 (IRCF 5 degrees), in the same manner as the case where the optical filter 130 is provided parallel to the end surface 110A of the light guide body 110 (with IRCF), at the center (0 mm) of the light guide body 110 in the longitudinal direction, the output distribution of red color is not changed or is very slightly changed even in a case where the optical filter 130 is not provided (without IRCF). Meanwhile, the output distribution of red color becomes smaller as a distance from the center (0 mm) is increased, and the output distribution becomes approximately −14% from the vicinity of approximately 70 mm (+70 mm, −70 mm) to the end portion (+150 mm, −150 mm). In this manner, a difference in output distribution of red color between the center and the end portion of the light guide body in the longitudinal direction becomes color unevenness.

On the other hand, unlike the case where the optical filter 130 is provided parallel to the end surface 110A of the light guide body 110 (with IRCF) and the case where the optical filter 130 is tilted by 5 degrees with respect to the end surface 110A of the light guide body 110 (IRCF 5 degrees), in a case where the optical filter 130 is tilted by 10 degrees with respect to the end surface 110A of the light guide body 110 (IRCF 10 degrees), the output distribution of red color becomes smaller even in a case where the distance from the center (0) is increased, and is only approximately −7%. From this, it can be seen that it is desirable that the optical filter 130 is tilted by, for example, approximately 10 degrees with respect to the end surface 110A of the light guide body 110. The optical filter 130 may be tilted by 10 degrees or more.

Housing

As illustrated in FIG. 4, the housing 114 has a box shape extending in the apparatus depth direction. As illustrated in FIG. 5, in the housing 114, a pair of light guide body accommodating portions 114A in which a pair of light guide bodies 110 are respectively accommodated, and a lens accommodating portion 114B which is formed between the pair of light guide body accommodating portions 114A and in which the rod lens array 112 is accommodated are formed.

Further, a substrate accommodating portion 114C in which the element substrate 106 and a part of a pressing member 120 are accommodated are formed in the housing 114.

As illustrated in FIGS. 4 and 5, the pair of light guide body accommodating portions 114A are formed side by side in the apparatus width direction, and each light guide body accommodating portion 114A extends in the apparatus depth direction. Further, a cross-section of each light guide body accommodating portion 114A intersecting in the longitudinal direction has a semicircular shape with an upper opening.

As illustrated in FIG. 5, the lens accommodating portion 114B is formed between the pair of light guide body accommodating portions 114A in the apparatus width direction, and goes through in the upward-downward direction. The lens accommodating portion 114B is formed with a pair of projections 116 that support an end portion of a lower surface of the rod lens array 112 in the apparatus width direction.

As illustrated in FIG. 4, the substrate accommodating portions 114C are formed in pairs on the back side and the front side in the apparatus depth direction with respect to the light guide body accommodating portion 114A, and each substrate accommodating portion 114C goes through in the upward-downward direction, as illustrated in FIG. 6. Specifically, the substrate accommodating portion 114C is formed between wall portions 119 at both ends of the housing 114 in the longitudinal direction and the light guide body accommodating portion 114A, and a flange 118 that comes into contact with a lower end of the element substrate 106 from below is formed below the substrate accommodating portion 114C.

Second Exemplary Embodiment

Next, a second exemplary embodiment will be described with reference to FIG. 14.

In the first exemplary embodiment described above, one optical filter 130 is provided at each of both ends of the light guide body 110, and one optical filter 130 is disposed with respect to the two light guide bodies 110, on one side and the other side of the light guide body 110. Meanwhile, in the second exemplary embodiment, two optical filters 130 are provided at each of both ends of the light guide body 110, and the optical filter 130 is disposed for each light guide body 110.

A portion different from the first exemplary embodiment described above will be generally described, and the description will be simplified or omitted for the duplicate portion.

Figure 14:
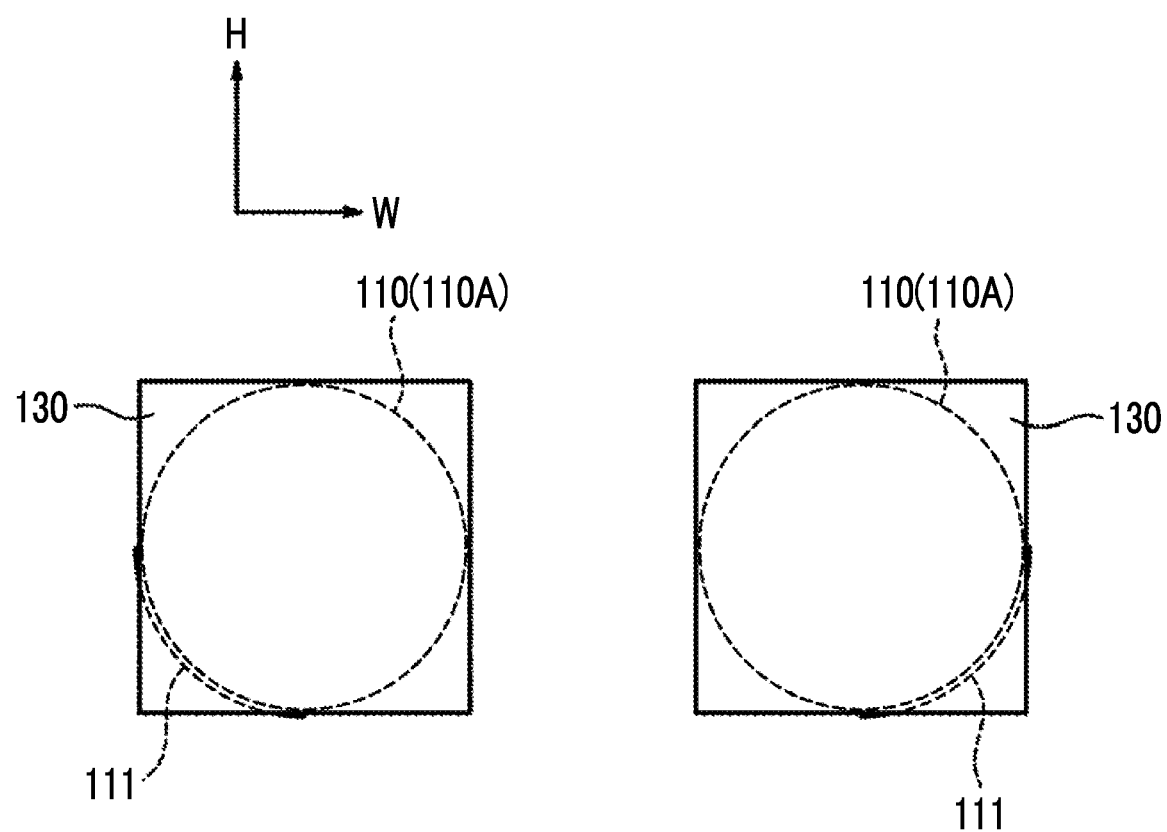
FIG. 14 is an explanatory diagram describing arrangement of a light guide body and an optical filter according to a second exemplary embodiment of the present invention.

FIG. 14 is a schematic explanatory diagram describing arrangement of the light guide body 110 and the optical filter 130 according to the present exemplary embodiment.

In the present exemplary embodiment, as illustrated in FIG. 14, one optical filter 130 is disposed for each end surface 110A of the two light guide bodies 110. In this manner, a size of the optical filter 130 can be made smaller than a size of the optical filter 130 in a case where one optical filter 130 is disposed for the two light guide bodies 110. Further, the point that the optical filter 130 is disposed to be tilted has the same manner as the first exemplary embodiment described above (see FIG. 6).

Third Exemplary Embodiment

Next, a third exemplary embodiment will be described with reference to FIG. 15.

In the second exemplary embodiment described above, the optical filter 130 is disposed to be tilted with respect to the end surface 110A of the light guide body 110 such that a position facing the diffusion pattern 111 side (apparatus downward direction) is farther from the light guide body 110 than a position facing the document G side (apparatus upward direction). Meanwhile, in the third exemplary embodiment, the optical filter 130 is disposed to be tilted with respect to the end surface 110A of the light guide body 110 such that a position facing the diffusion pattern 111 side and away from the other optical filter 130 is further from the light guide body 110 than a position facing the document G side.

A portion different from the second exemplary embodiment described above will be generally described, and the description will be simplified or omitted for the duplicate portion.

Figure 15:
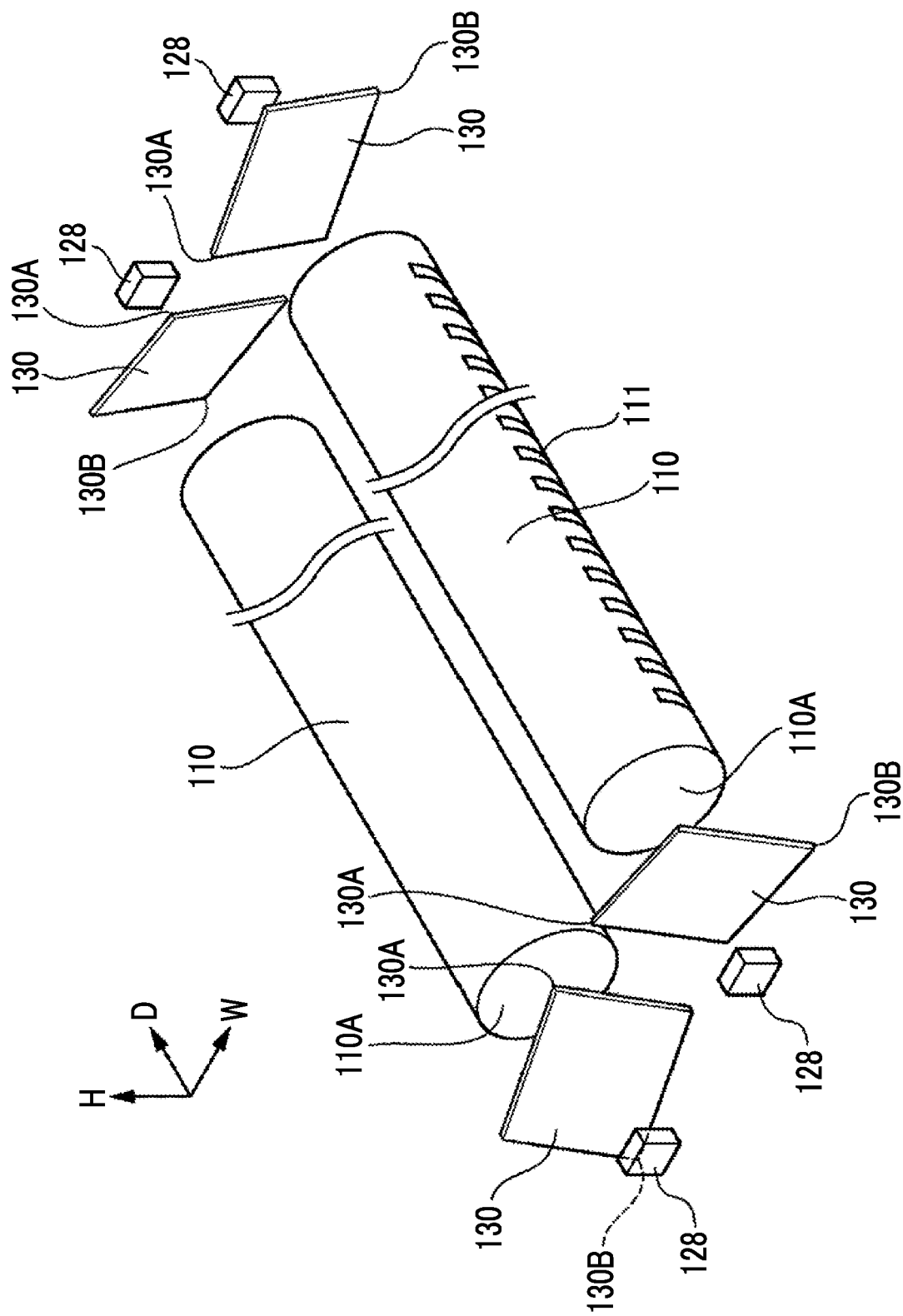
FIG. 15 is an explanatory diagram describing arrangement of a light guide body and an optical filter according to a third exemplary embodiment of the present invention.

FIG. 15 is a schematic explanatory diagram describing arrangement of the light guide body 110 and the optical filter 130 according to the present exemplary embodiment.

In the present exemplary embodiment, as illustrated in FIG. 15, the optical filter 130 is disposed to be tilted with respect to the end surface 110A of the light guide body 110 such that a position facing the diffusion pattern 111 side and away from the other optical filter 130 is farther from the light guide body 110 than a position facing the document G side. Specifically, the flat-plate optical filter 130 is disposed such that a central side corner portion 130A of the optical filter 130 is closest to the end surface 110A of the light guide body 110, and an end portion side corner portion 130B is farthest from the end surface 110A of the light guide body 110, in the flat-plate optical filter 130. Therefore, red color of light emitted to the diffusion pattern 111 side is not cut and reaches the diffusion pattern 111. The light reaching the diffusion pattern 111 is diffused and emitted to the document G, so that the document G can be read without color unevenness.

Fourth Exemplary Embodiment

Next, a fourth exemplary embodiment will be described with reference to FIG. 16.

In the first to third exemplary embodiments described above, the optical filter 130 is formed on a flat plate. Meanwhile, in the fourth exemplary embodiment, the optical filter 130 is formed in a substantially semi-cylindrical shape having a side surface facing the end surface 110A of the light guide body 110.

A portion different from the first exemplary embodiment to the third exemplary embodiment described above will be generally described, and the description will be simplified or omitted for the duplicate portion.

Figure 16:
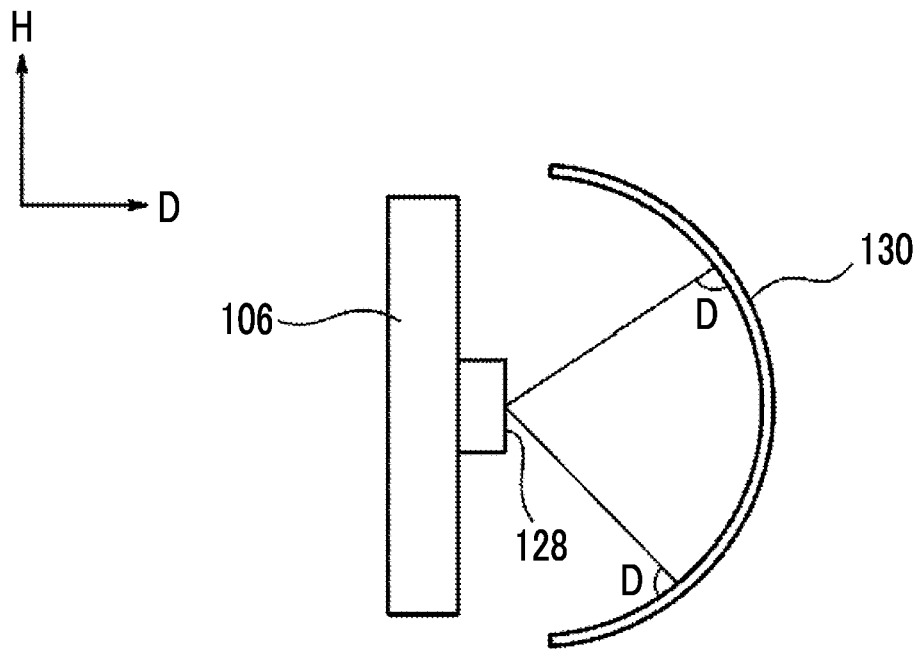
FIG. 16 is an explanatory diagram describing arrangement of a light guide body and an optical filter according to a fourth exemplary embodiment of the present invention.

FIG. 16 is a schematic explanatory diagram describing arrangement of the light guide body 110 and the optical filter 130 according to the present exemplary embodiment.

In the present exemplary embodiment, as illustrated in FIG. 16, the optical filter 130 is formed in a substantially semi-cylindrical shape, and the side surface of the substantially semi-cylindrical shape is disposed toward the end surface 110A of the light guide body 110. Here, as illustrated in FIG. 16, the substantially semi-cylindrical shape has a center of the cylinder as the light emitting element 128, and is formed in a curved shape such that angles D formed by light emitted from the light emitting element 128 to the optical filter 130 and a normal line with respect to a plane of the optical filter 130 are the same. The angles at which the light emitted from the light emitting element 128 is incident on the optical filter 130 are substantially the same regardless of a position. Therefore, an angle dependence of the optical filter 130 is not affected, red color light blocked by the optical filter 130 is not biased, and color unevenness is prevented from occurring in a read image in a main scanning direction.

The optical filter 130 formed in the substantially semi-cylindrical shape may be disposed as one with respect to the two light guide bodies as in the first exemplary embodiment, or may be disposed for each light guide as in the second exemplary embodiment or in the third exemplary embodiment.

Fifth Exemplary Embodiment

Next, a fifth exemplary embodiment will be described with reference to FIG. 17.

In the first to third exemplary embodiments described above, the optical filter 130 is formed on a flat plate. Meanwhile, in the fifth exemplary embodiment, the optical filter 130 is formed in a spherical crown shape projecting toward the end surface 110A of the light guide body 110.

A portion different from the first exemplary embodiment described above will be generally described, and the description will be simplified or omitted for the duplicate portion.

Figure 17:
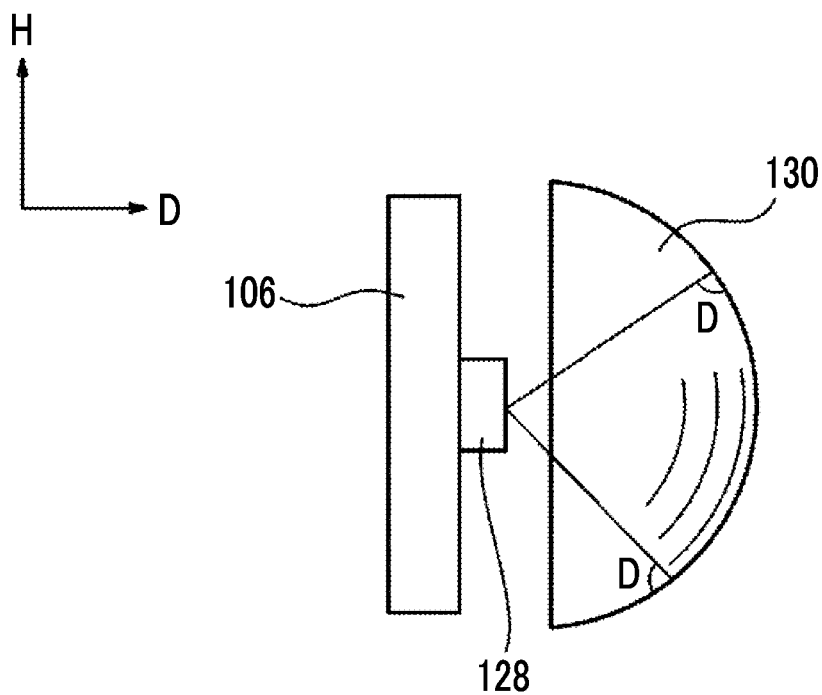
FIG. 17 is an explanatory diagram describing arrangement of a light guide body and an optical filter according to a fifth exemplary embodiment of the present invention.

FIG. 17 is a schematic explanatory diagram describing arrangement of the light guide body 110 and the optical filter 130 according to the present exemplary embodiment.

In the present exemplary embodiment, as illustrated in FIG. 17, the optical filter 130 is formed in a spherical crown shape projecting toward the end surface 110A of the light guide body 110. Here, in the same manner as in the fourth exemplary embodiment described above, the spherical crown shape has a center of the sphere as the light emitting element 128, and is formed in a curved shape such that the angles D formed by light emitted from the light emitting element 128 to the optical filter 130 and a normal line with respect to a plane of the optical filter 130 are the same. The angles at which the light emitted from the light emitting element 128 is incident on the optical filter 130 are substantially the same regardless of a position. Therefore, an angle dependence of the optical filter 130 is not affected, red color light blocked by the optical filter 130 is not biased, and color unevenness is prevented from occurring in the read image in the main scanning direction.

The optical filter 130 formed in a spherical crown shape is disposed for each light guide body, as in the second exemplary embodiment or the third exemplary embodiment.

Sixth Exemplary Embodiment

Next, a sixth exemplary embodiment will be described.

In the first to fifth exemplary embodiments described above, the optical filter 130 is disposed to be tilted. Meanwhile, in the sixth exemplary embodiment, the diffusion pattern 111 disposed on the central side of the light guide body in the longitudinal direction is formed by printing with an ink that absorbs infrared light.

A portion different from the first exemplary embodiment to the fifth exemplary embodiment described above will be generally described, and the description will be simplified or omitted for the duplicate portion.

In the present exemplary embodiment, the diffusion pattern 111 disposed on the central side of the light guide body 110 in the longitudinal direction is formed by printing with an ink that absorbs infrared light. Here, the central side of the light guide body 110 in the longitudinal direction is a portion at which red color is output more strongly than the other portions, for example, a portion of +50 mm, −50 mm from a center of the light guide body 110 in the longitudinal direction (see FIG. 13). By absorbing the infrared light of the portion at which the red color of the light guide body 110 is output more strongly than the other portions, a difference of an output of red color with the end portion side, at which red color is output smaller than the central side, is reduced to prevent color unevenness from occurring in the read image in the main scanning direction.

In the present exemplary embodiment, the optical filters 130 according to the first to fifth exemplary embodiments described above may be disposed, or the optical filters 130 may not be disposed.

Further, in the present exemplary embodiment, the diffusion pattern 111 disposed on the central side of the light guide body 110 in the longitudinal direction is not limited to the case of printing with an ink that absorbs infrared light. Before printing the diffusion pattern 111, the infrared light absorbing ink may be applied to the central side of the light guide body 110 in the longitudinal direction, in a printing region of the diffusion pattern 111.

The exemplary embodiment of the present invention is not limited to the exemplary embodiment described above, and various modifications and applications are possible without departing from the gist of the exemplary embodiment of the present invention.

For example, in the exemplary embodiments described above, the two light guide bodies 110 are provided, and one or three or more light guide bodies 110 may be provided.

Further, the light emitting elements 128 are disposed on both end sides of the light guide body 110 to irradiate the light guide body 110 with light, and the present invention is not limited to this. The light emitting element 128 may be disposed on only any one side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading apparatus comprising:
a light source;
a film-shaped optical filter that blocks light having a predetermined wavelength among light from the light source; and
a cylindrical light guide body that guides light passing through the optical filter and incident on one end surface to the other end surface, and irradiates an irradiation target body with light emitted from a side surface,
wherein a diffusion pattern that diffuses the light is disposed on an opposite side not facing the irradiation target body, on the side surface of the light guide body, and
the optical filter is disposed at a position facing the end surface of the light guide body to be tilted with respect to the end surface of the light guide body, wherein the optical filter is disposed such that an angle formed by the light from the light source and a normal line with respect to a plane of the optical filter is smaller on a side facing a diffusion pattern side than on a side facing an irradiation target body side of the end surface of the light guide body.

2. The reading apparatus according to claim 1,
wherein the optical filter is disposed to be tilted with respect to the end surface of the light guide body such that a position of the optical filter facing a diffusion pattern side is farther from the light guide body than a position of the optical filter facing an irradiation target body side.

3. The reading apparatus according to claim 1,
wherein the optical filter is disposed such that an angle formed by the light from the light source and a normal line with respect to a plane of the optical filter is smaller on a side facing a diffusion pattern side than on a side facing an irradiation target body side of the end surface of the light guide body.

4. The reading apparatus according to claim 2,
wherein the optical filter is disposed such that an angle formed by the light from the light source and a normal line with respect to a plane of the optical filter is smaller on a side facing a diffusion pattern side than on a side facing an irradiation target body side of the end surface of the light guide body.

5. The reading apparatus according to claim 1,
wherein two light guide bodies are provided in parallel, the light source is disposed for each light guide body, and one optical filter is disposed for one end surfaces of the two light guide bodies.

6. The reading apparatus according to claim 2,
wherein two light guide bodies are provided in parallel, the light source is disposed for each light guide body, and one optical filter is disposed for one end surfaces of the two light guide bodies.

7. The reading apparatus according to claim 1,
wherein two light guide bodies are provided in parallel, the light source is disposed for each light guide body, and one optical filter is disposed for one end surfaces of the two light guide bodies.

8. The reading apparatus according to claim 4,
wherein two light guide bodies are provided in parallel, the light source is disposed for each light guide body, and one optical filter is disposed for one end surfaces of the two light guide bodies.

9. The reading apparatus according to claim 1,
wherein two light guide bodies are provided in parallel, the light source is disposed for each light guide body, and the optical filter is disposed for each light guide body.

10. The reading apparatus according to claim 2,
wherein guide bodies are provided in parallel, the light source is disposed for each light guide body, and the optical filter is disposed for each light guide body.

11. The reading apparatus according to claim 1,
wherein two light guide bodies are provided in parallel, the light source is disposed for each light guide body, and the optical filter is disposed for each light guide body.

12. The reading apparatus according to claim 4,
wherein two light guide bodies are provided in parallel,
the light source is disposed for each light guide body, and
the optical filter is disposed for each light guide body.

13. The reading apparatus according to claim 9,
wherein the optical filter is disposed on the one end surface and the other end surface of the light guide body.

14. The reading apparatus according to claim 10,
wherein the optical filter is disposed on the one end surface and the other end surface of the light guide body.

15. The reading apparatus according to claim 11,
wherein the optical filter is disposed on the one end surface and the other end surface of the light guide body.

16. The reading apparatus according to claim 12,
wherein the optical filter is disposed on the one end surface and the other end surface of the light guide body.

17. The reading apparatus according to claim 9,
wherein the diffusion pattern is disposed on the opposite side not facing the irradiation target body and away from the other light guide body, on the side surface of each of the two light guide bodies, and
the optical filter is disposed to be tilted with respect to the end surface of the light guide body such that a position of the optical filter facing a diffusion pattern side and away from the other optical filter is farther from the light guide body than a position of the optical filter facing an irradiation target body side.

18. The reading apparatus according to claim 10,
wherein the diffusion pattern is disposed on the opposite side not facing the irradiation target body and away from the other light guide body, on the side surface of each of the two light guide bodies, and
the optical filter is disposed to be tilted with respect to the end surface of the light guide body such that a position of the optical filter facing a diffusion pattern side and away from the other optical filter is farther from the light guide body than a position of the optical filter facing an irradiation target body side.

19. An image forming apparatus comprising:
the reading apparatus according to claim 1.

20. A reading method comprising:
disposing a diffusion pattern that diffuses light on an opposite side not facing an irradiation target body, on a side surface of a light guide body; and
disposing an optical filter at a position facing an end surface of the light guide body to be tilted with respect to the end surface of the light guide body, wherein the optical filter is disposed such that an angle formed by the light from the light source and a normal line with respect to a plane of the optical filter is smaller on a side facing a diffusion pattern side than on a side facing an irradiation target body side of the end surface of the light guide body.

* * * * *